US012607173B2

(12) United States Patent　　　　　　　(10) Patent No.:　US 12,607,173 B2

Pham et al.　　　　　　　　　　　　　(45) Date of Patent:　　Apr. 21, 2026

(54) MOTOR LOAD INTERFACE SEALING ARRANGEMENT

(71) Applicant: Goodrich Actuation Systems SAS, Vernon (FR)

(72) Inventors: Tran-Quoc Pham, Soisy-sous-Montmorency (FR); Hippolyte Marrant, Paris (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/937,921

(22) Filed: Nov. 5, 2024

(65) Prior Publication Data

US 2025/0154967 A1　　　May 15, 2025

(30) Foreign Application Priority Data

Nov. 15, 2023　(EP) ..................................... 23306976

(51) Int. Cl.
　*F04B 1/2014*　　　(2020.01)
　*F15B 13/02*　　　(2006.01)
　*F16J 15/3204*　　(2016.01)
(52) U.S. Cl.
　CPC .......... *F04B 1/2014* (2013.01); *F15B 13/027* (2013.01); *F16J 15/3204* (2013.01)
(58) Field of Classification Search
　CPC .......... F16J 15/54; F04B 1/0448; F04B 53/00
　See application file for complete search history.

(56) References Cited

U.S. PATENT DOCUMENTS

| | | | | | |
|---|---|---|---|---|---|
| 3,951,417 | A | * | 4/1976 | Chernykh | ................ F16J 15/34 |
| | | | | | 277/362 |
| 4,621,981 | A | * | 11/1986 | Lorett | .................. F16J 15/3484 |
| | | | | | 415/168.2 |
| 8,997,626 | B2 | | 4/2015 | Anderson | |

(Continued)

FOREIGN PATENT DOCUMENTS

| | | | | | |
|---|---|---|---|---|---|
| CN | | 110500257 A | * | 11/2019 | ............ F04B 23/106 |
| DE | 102014212183 A1 | * | 12/2015 | | .............. F04B 1/324 |

(Continued)

OTHER PUBLICATIONS

Abstract for DE102014212183 (A1), Published: Dec. 31, 2015, 1 page.

(Continued)

*Primary Examiner* — Thomas E Lazo

(74) *Attorney, Agent, or Firm* — CANTOR COLBURN LLP

(57)　　　　　　ABSTRACT

A sealing arrangement for the interface between a fluidic load and a motor. The sealing arrangement includes: a rotating shaft having a shaft body extending along an axis (A) and having a first end, configured to, in use, be in driving engagement with a fluidic load, and a second end configured to, in use, be in engagement with a motor for rotation by the motor, the rotating shaft and a shoulder extending radially outwards from the shaft body at the first end. The sealing arrangement further includes: a first, major seal extending radially around the shaft; a second, minor seal axially spaced from the first seal towards the second end and mounted around the shaft, and a seal holder block located between the first seal and the second seal around the shaft body.

13 Claims, 2 Drawing Sheets

(56) References Cited

U.S. PATENT DOCUMENTS

| | | | |
|---|---|---|---|
| 9,273,703 B2 | 3/2016 | Sweeney et al. | |
| 9,500,206 B2 | 11/2016 | Zammuto | |
| 9,663,084 B2 * | 5/2017 | Maeda .................. | B60T 11/224 |
| 10,075,041 B2 | 9/2018 | Claycomb et al. | |
| 2010/0193296 A1 * | 8/2010 | Sora ........................ | F16H 57/04 |
| | | | 184/14 |
| 2012/0308424 A1 * | 12/2012 | Tadano ................. | B60T 8/4031 |
| | | | 277/552 |
| 2018/0156214 A1 | 6/2018 | Ogawa et al. | |
| 2018/0266417 A1 | 9/2018 | Broekx et al. | |

FOREIGN PATENT DOCUMENTS

| | | | |
|---|---|---|---|
| EP | 1050680 | A2 | 11/2000 |
| JP | 6339400 | B2 | 5/2018 |

OTHER PUBLICATIONS

Abstract for EP1050680 (A2), Published: Nov. 8, 2000, 1 page.
Abstract for JP6339400 (B2), Published: Jun. 6, 2018, 1 page.
European Search Report for Application No. 23306976.4, mailed
Mar. 28, 2024, 9 pages.

* cited by examiner

MOTOR LOAD INTERFACE SEALING ARRANGEMENT

CROSS-REFERENCE TO RELATED APPLICATIONS

This application claims the benefit of European Patent Application No. 23306976.4 filed Nov. 15, 2023, the disclosure of which is incorporated herein by reference in its entirety.

TECHNICAL FIELD

The present disclosure is concerned with an interface between an electric motor and a fluidic load, by which is meant a load that operates using fluid or in the presence of fluid, where the electric motor needs to be isolated from any potential fluid ingress. Such an interface may be, for example, between an electric motor and a pump e.g. for an actuator such as an electrohydrostatic actuator, EHA, or an electric backup hydraulic actuator, EBHA, driven by the electric motor. The interface may be an adaptor or connector part located between the motor and the load or may be provided by direct connection between the motor and the load.

BACKGROUND

Electric motors are used to drive a variety of loads in many fields. In some cases, the load may present a fluid environment, and there may be the possibility of ingress of fluid into the electric motor e.g. due to pressure or capillary effects.

Electrohydrostaticic actuators, for example, are well-known and find application in various fields where there is a need to move a part or a surface. An example is the use of EHAs on aircraft to control movement of flight control surfaces. Such actuators typically comprise a motor, a hydraulic pump and a hydraulic piston or ram. In operation, the motor is powered to drive the pump to pump hydraulic fluid to move the piston.

A typical motor for such an actuator comprises a magnetic rotor mounted to a rotary shaft, and a stator, having a magnetic permeable core and field windings. When electrical current is supplied to the windings, a magnetic field is generated in the stator core which causes the rotor and, hence, the shaft to rotate. Rotation of the shaft drives the pump. Such motor design and operation, as well as other types of rotary motor, are well-known in the art.

A problem with motors that drive EHA pumps or other fluidic loads, is that the motor parts need to be protected from the hydraulic fluid to avoid damage to, and degradation or contamination of the motor parts such as the field windings, wiring, insulation etc. Fluid between the motor and the load, e.g. pump, can also cause electrical shortcuts. Due to the presence of fluid near the motor and the difficulties in clearly segregating the motor from the fluid, EHA pumps and other such loads typically use so-called 'wet' or immersed electrical motors which are able to operate in a 'wet' environment by having the coils protected by a protective covering or sleeve. The gap between the rotor and the stator must be large enough to enable the hydraulic fluid to flow. Because of the presence of the protective sleeves (introducing Eddy current losses) and the oil flow passage, containing viscous oil (more so at low temperatures), and because of the air-gap increase, the coils need to be correspondingly larger to provide sufficient torque to drive the shaft than would be the case for a 'dry' motor. The larger the coils are, the greater the heat to be dissipated and so there is then also a need for fans or heat sinks, and for a larger casing. This, in turn, further increases the size, weight and cost of the motor.

In terms of size and weight, which is an important factor in many fields, e.g. in aircraft, it would be desirable to use a dry motor that does not require such sleeves and oil flow passages, and so can have smaller coils to supply the same useful torque to the load e.g. pump. The lack of technology to ensure effective sealing between the hydraulic fluid/pump and the motor, however, has meant that such motors cannot be typically used with hydraulic actuators, or other loads where fluid is present and could ingress to the motor.

There is a desire, therefore, to improve the sealing at the interface between a load and a motor, so that the load can be driven by a dry motor and the motor is, nevertheless, protected from the adverse effect of the fluid.

SUMMARY

According to this disclosure, there is provided a sealing arrangement for the interface between a fluidic load and a motor, the sealing arrangement comprising: a rotating shaft having a shaft body extending along an axis and having a first end, configured to, in use, be in driving engagement with a fluidic load, and a second end configured to, in use, be in engagement with a motor for rotation by the motor, the rotating shaft and a shoulder extending radially outwards from the shaft body at the first end; wherein the sealing arrangement further comprises: a first, major seal extending radially around the shaft; a second, minor seal axially spaced from the first seal towards the second end and mounted around the shaft, and a seal holder block located between the first seal and the second seal around the shaft body; the seals arranged such that pressure acting on an axially outer surface of the shoulder causes the first seal to create a seal with the seal holder block against fluid flow past the shoulder, and wherein the second seal prevents flow of any fluid that has passed the first seal passing the second seal.

The first seal may be e.g. a flat seal and the second seal may be a lip seal.

Drain channels may be provided in the region between the seals to drain off fluid from microleakages from the first seal that have been contained by the second seal. The fluid may be drained into a collection tank.

Also provided is an EHA having such a sealing arrangement.

BRIEF DESCRIPTION OF THE FIGURES

Examples of the solution provided by this disclosure will now be described with reference to the drawings. These are examples only, and variations are, of course, possible within the scope of the claims.

DETAILED DESCRIPTION

As mentioned above, the solution described herein is applicable to many electric motor/fluidic load interfaces.

The use of the solution provide herein will be described in relation to EHAs by way of example only.

Figure 1:
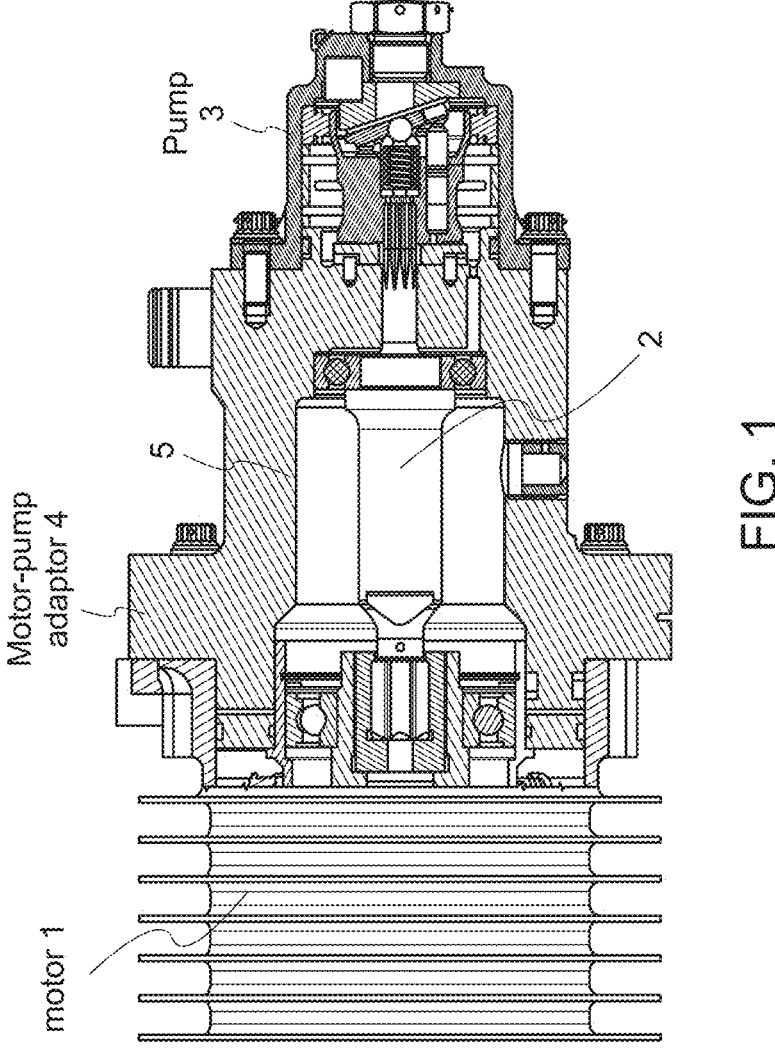
FIG. 1 is a cross-sectional view of a typical hydraulic actuator design, which would generally require a 'wet' or immersed motor as there is no reliable sealing of the motor from the hydraulic fluid.

FIG. 1 shows a typical EHA design having a motor 1, which can be of any suitable design, connected via a rotating shaft 2 to drive a hydraulic pump 3. In the example shown, the motor is connected to the pump via a motor-pump adaptor 4 that houses the shaft 2. In other designs, the shaft may be formed as an integral part of one or other of the motor and the pump such that no adaptor is needed at the motor-pump interface. In the example, and in typical EHAs, the pump hydraulic fluid 5, e.g. oil or other pressurised fluid, may flow around the shaft 2 and across the interface (here adaptor 4) to the motor 1. As mentioned above, for this reason, the motor needs to be designed with protective features to allow it to be immersed in the fluid, which results in a relatively large, heavy motor design compared to a typical 'dry' motor.

Figure 2:
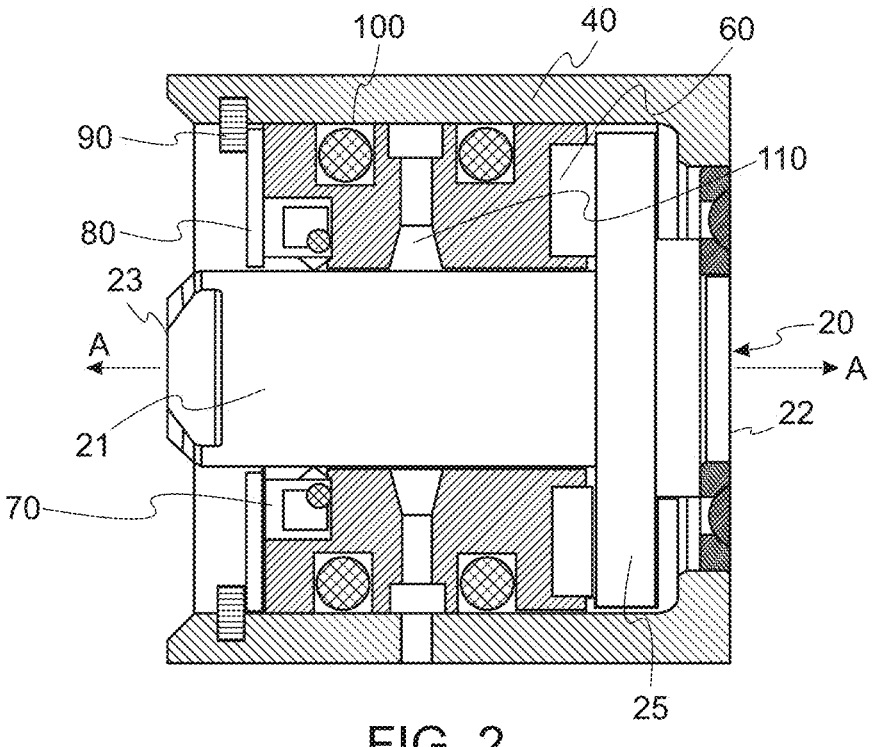
FIG. 2 shows a view of an interface between a motor and a pump according to this disclosure, which enables a dry motor to be used.
Figure 3:
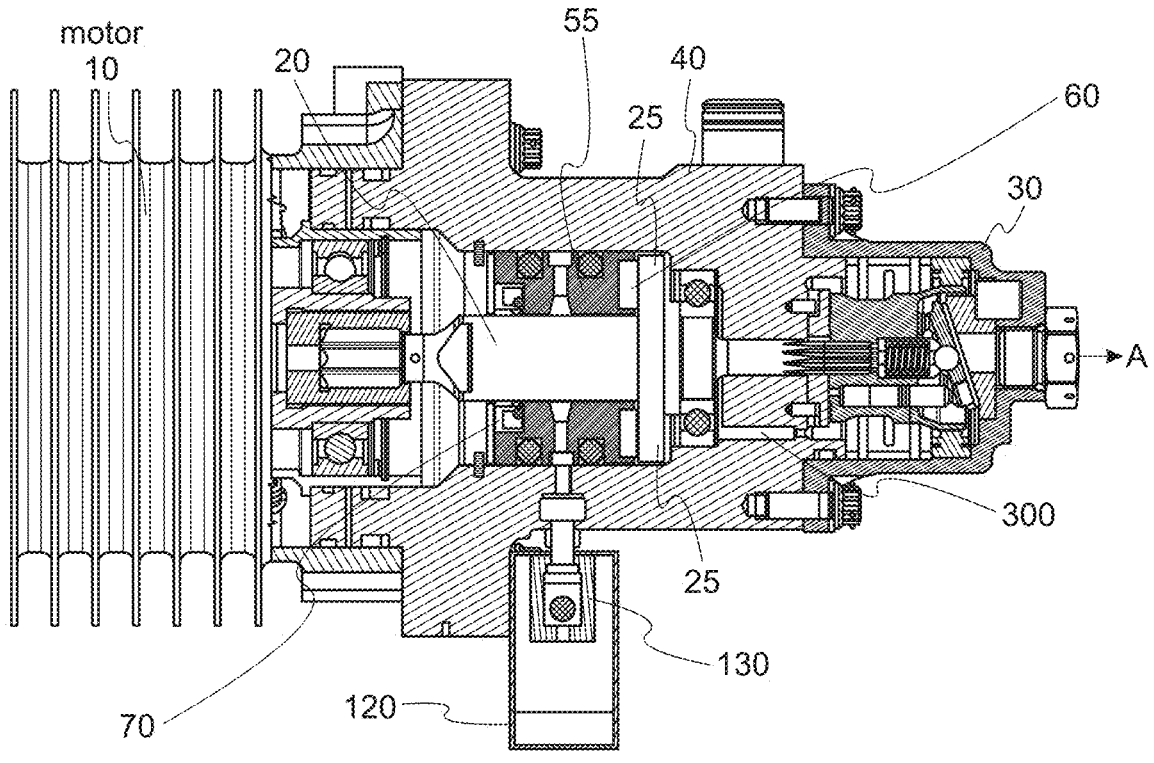
FIG. 3 is a cross-sectional view of a hydraulic actuator design incorporating the interface design according to this disclosure.

The present disclosure provides an interface with an improved sealing arrangement between the pump and the motor which, in use, prevents hydraulic fluid leaking from the pump to the motor. The sealing arrangement includes a first, major, sealing part which will prevent most of the fluid from the pump passing, and then a second, minor sealing part that prevents any fluid that has passed the first sealing part from reaching the motor. This will be described in more detail with reference to the examples in FIGS. 2 and 3.

The sealing arrangement includes a shaft 20 which, in use, will provide the linking shaft 20 between the motor 10 and the pump 30. The shaft 20 comprises a shaft body 21 extending in an axial direction A from a first end 22 which, in use, is in driving engagement with the pump 30, and a second end 23 which, in use, is in engagement with the motor 10, such that rotation of the motor causes rotation of the shaft 20. The shaft 20 extends through an interface housing 40. This may be a separate adaptor part or may be part of the pump and/or the motor.

A shoulder 25 is provided at the first end of the shaft and extends radially outwardly from the shaft body 21. The shoulder extends substantially across the housing 40 in the radial dimension.

The sealing arrangement further comprises a first, major, seal 60 axially inwards of and in contact with the shoulder. The first seal 60 may be integrally formed with or mounted to the shoulder or may be secured adjacent the shoulder. In the example shown, the first seal 60 is mounted in a groove formed in the seal holder block. The first seal may be a large surface area, flat seal but other seal designs, e.g. a circular seal, a seal with grooves, or other features, may also be used.

At the second end of the shaft, a second, minor seal 70 is provided around the shaft. This may be a smaller seal and, in the example shown, is a lip seal that is secured in place by a washer 80. A seal holder block 55 is provided between the first and the second seal.

The example also shows a stop ring 90 that secures the washer 80 against movement due to fluid pressure, and additional seals 100 e.g. O-ring seals, but these are optional features.

In the region between the first seal 60 and the second seal 70 (as defined in the axial direction A) grooves or channels 110 are provided, extending in the radial direction, to capture any fluid that passes the first seal but is stopped by the second seal (typical microleakages) and lead such fluid away from the interface e.g. into a tank 120. The tank 120 may be removable, for emptying, or may be provided with a tap or drain to drain off fluid collected in the tank. A check valve 130 may be provided at the tank 120 to prevent leaked fluid flowing back from the tank into the motor area.

In operation, the pressure of the hydraulic fluid 300 in the pump 30 acts on the shaft shoulder 25 which compresses the first seal 60 to seal across the interface 40 in the axial direction and prevent, or substantially reduce fluid flow past the first seal towards the motor 10. Due to the large surface contact areas of the shoulder and the first seal (and the contact area that the shoulder presents to the fluid), the first seal is pressed more tightly against the seal holder 55 thus increasing the sealing effect. When designing the shoulder and the seal, consideration may be given to the roughness and the hardness of the contact surfaces to ensure optimal sealing and minimise wear on the seal. The seal dimensions should also be considered to minimise the frictions that tend to reduce the torque provided by the motor.

Despite the improved sealing of the first seal, there is the possibility that some fluid will leak past the first seal (so-called 'microleakages') into the region of the seal holder block 55. These leakages are contained by the second seal 70, secured by the washer 80, before they can reach the motor. The leakages contained between the first and second seal can then be removed from the interface via grooves or channels 110 which may be formed in the seal holder block by e.g. drilling, and the leakages may be fed out to a tank 120 or drained off from the sealing arrangement at the interface.

As mentioned above, in some examples, the shaft may be formed integrally with the motor or with the pump. The sealing arrangement of this disclosure can still isolate the motor from the fluid with the sealing arrangement as described, mounted around the shaft regardless of whether it is part of the motor, part of the pump or runs through an adaptor.

Because of the improved sealing between the pump an the motor, the motor does not need to be a 'wet' or 'immersed' motor and does not need to be dimensioned to allow for drag losses and protective sleeves' Eddy current losses leading to larger coils. The overall actuator design can, therefore, be lighter and smaller.

The invention claimed is:

1. A sealing arrangement for the interface between a fluidic load and a motor, the sealing arrangement comprising:

a rotating shaft having a shaft body extending along an axis (A) and having a first end, configured to, in use, be in driving engagement with a fluidic load, and a second end configured to, in use, be in engagement with a motor for rotation by the motor, the rotating shaft and a shoulder extending radially outwards from the shaft body at the first end; wherein the sealing arrangement further comprises:

a first, major seal extending radially around the shaft;

a second, minor seal axially spaced from the first seal towards the second end and mounted around the shaft; and a seal holder block located between the first seal and the second seal around the shaft body;

wherein the seals are arranged such that pressure acting on an axially outer surface of the shoulder causes the first seal to create a seal with the seal holder block against fluid flow past the shoulder; and wherein the second seal prevents flow of any fluid that has passed the first seal passing the second seal;

wherein the sealing arrangement is mounted within a housing; and wherein the radial dimension of the shoulder is substantially the same as an inner radial dimension of the housing.

2. The sealing arrangement of claim 1, wherein the first seal is a flat seal.

3. The sealing arrangement of claim 1, wherein the first seal extends radially from the shaft substantially to the housing.

4. The sealing arrangement of claim 1, wherein the first seal is secured to, or fitted in a groove of the seal holder block.

5. The sealing arrangement of claim 1, wherein the second seal is a lip seal.

6. The sealing arrangement of claim 1, wherein the second seal is axially secured by a washer.

7. The sealing arrangement of claim 6, wherein the washer is axially secured by a stop ring.

8. The sealing arrangement of claim 1, further comprising:

one or more fluid drain channels extending through the seal holder block for the passage of fluid in the area between the first and the second seal.

9. The sealing arrangement of claim 8, further comprising:

a fluid collection tank in fluid communication with the one or more fluid drain channels.

10. The sealing arrangement of claim 9, further comprising a check valve associated with the tank to prevent return of fluid from the tank.

11. An actuator assembly comprising:

a sealing arrangement as claimed in claim 1, wherein:

the sealing arrangement is arranged between the motor and the load; and the shaft is connected at the first end in driving engagement with the load; and wherein the shaft is in connection with and rotatable by the motor at the second end.

12. The assembly of claim 11, wherein the fluidic load is a hydraulic pump.

13. The assembly of claim 11, wherein the assembly is an electrohydrostatic actuator or an electric backup hydraulic actuator.

\* \* \* \* \*